(12) United States Patent
Everett et al.

(10) Patent No.: US 9,154,638 B2
(45) Date of Patent: Oct. 6, 2015

(54) DATA COMMUNICATION

(75) Inventors: Philip A Everett, Ipswich (GB); Christopher M Croot, Bury St Edmunds (GB); Trevor P Linney, Stowmarket (GB); Ashley Pickering, Ipswich (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 327 days.

(21) Appl. No.: 12/922,250

(22) PCT Filed: Mar. 25, 2009

(86) PCT No.: PCT/GB2009/000782
§ 371 (c)(1),
(2), (4) Date: Sep. 13, 2010

(87) PCT Pub. No.: WO2009/122137
PCT Pub. Date: Oct. 8, 2009

(65) Prior Publication Data
US 2011/0010444 A1    Jan. 13, 2011

(30) Foreign Application Priority Data
Mar. 31, 2008   (GB) ................. 08251250.0

(51) Int. Cl.
*G06F 15/173*   (2006.01)
*H04M 11/06*   (2006.01)
(Continued)

(52) U.S. Cl.
CPC ............. *H04M 11/062* (2013.01); *H04L 12/24* (2013.01); *H04L 41/00* (2013.01); *H04L 41/32* (2013.01); *H04M 3/304* (2013.01)

(58) Field of Classification Search
CPC ... H04M 3/42068; H04M 15/66; H04L 47/25
USPC .......................................... 709/223
See application file for complete search history.

(56) References Cited

U.S. PATENT DOCUMENTS

| | | | |
|---|---|---|---|
| 2003/0087659 A1* | 5/2003 | Wang | 455/517 |
| 2005/0123028 A1* | 6/2005 | Cioffi et al. | 375/222 |
| 2009/0097554 A1* | 4/2009 | Savoor et al. | 375/240.08 |

FOREIGN PATENT DOCUMENTS

| | | |
|---|---|---|
| CN | 101072048 A | 10/2009 |
| CN | 1914855 A | 12/2010 |

(Continued)

OTHER PUBLICATIONS

Jagannathan, S.; Pourahmad, V.; Kibeom Seong; Cioffi, J.M.; Ouzzif, M.; Tarafi, R., "Common-mode data transmission using the binder sheath in digital subscriber lines," Communications, IEEE Transactions on , vol. 57, No. 3, pp. 831,840, Mar. 2009.*

(Continued)

*Primary Examiner* — Taylor Elfervig
(74) *Attorney, Agent, or Firm* — Nixon & Vanderhye, P.C.

(57) ABSTRACT

A management device (100) for use in an access network (10, 19, 20, 30, 40, 100) including a plurality of data connections (18, 19, 20) between end user devices (10) and an aggregation transceiver device (20) where the connections (18, 19, 20) are aggregated for onward connection through the access network (20, 30, 40), the access network storing in association with each data connection a Dynamic Line Management, DLM, profile which specifies a set of values for a plurality of parameters associated with the respective data connection. The device includes initial profile selection means for, when a line is to be caused to operate in a rate adaptive mode, selecting an initial profile for the line from among the plurality of stored different profiles in dependence upon one or more measurements, or a parameter or parameters derived from one or more measurements, made in respect of the connection while operating in another mode.

14 Claims, 4 Drawing Sheets

(51) Int. Cl.
H04L 12/24 (2006.01)
H04M 3/30 (2006.01)

(56) References Cited

FOREIGN PATENT DOCUMENTS

| EP | 2 110 988 A1 | 10/2009 | | |
|----|----|----|----|----|
| EP | 2 259 564 A1 | 12/2010 | | |
| WO | WO2007012867 | * | 2/2007 | H04Q 11/04 |
| WO | WO 2008/093045 | * | 8/2008 | H04L 12/26 |

OTHER PUBLICATIONS

Kamkar-Parsi, A.H.; Bessens, G.; Bouchard, M.; Yeap, T.H., "Wideband crosstalk interference cancelling on xDSL using adaptive signal processing and common mode signal," Acoustics, Speech, and Signal Processing, 2004. Proceedings. (ICASSP '04). IEEE International Conference on , vol. 4, no., pp. iv,1045-8 vol. 4, May 17-21, 2004.*

Pecourt, F.; Hauptmann, J.; Tenen, A., "An integrated adaptive analog balancing hybrid for use in (A)DSL modems," Solid-State Circuits Conference, 1999. Digest of Technical Papers. ISSCC. 1999 IEEE International , vol., no., pp. 252,253, Feb. 17-17, 1999.*

International Search Report and Written Opinion of the International Searching Authority (10 pgs.) dated Jul. 10, 2009 issued in International Application No. PCT/GB2009/000782.
European Search Report (6 pgs.) dated Oct. 15, 2008 issued in European Application No. 08251250.0.
"Dynamic Line Management for Digital Subscriber Lines" Internet Citation, [Online], Apr. 2005, XP002442256, retrieved from the internet on Jul. 12, 2007.
Liam: "Improvements to BT's Dynamic Line Management" [Online], Jul. 30, 2007, XP002497900, retrieved from the internet on Sep. 17, 2008.
International Search Report for PCT/GB2009/000782, mailed Jul. 10, 2009.
"Dynamic Line Management for Digital Subscriber Lines", Internet Citation [Online], (Apr. 2005).
Liam: "Improvements to BT's Dynamic Line Management" [Online], (Jul. 30, 2007).
First Notification of Office Action (3 pgs.) dated Sep. 5, 2012 issued in corresponding Chinese Office Action 200980111405.5.
Search Report (2 pgs.) dated Aug. 24, 2012 issued in corresponding Chinese Office Action 200980111405.5 with an at least partial English-language translation thereof (2 pgs.).
Office Action (5 pgs.) dated Sep. 5, 2012 issued in corresponding Chinese Office Action 200980111405.5 with an at least partial English-language translation thereof (4 pgs.).

* cited by examiner

DATA COMMUNICATION

This application is the U.S. national phase of International Application No. PCT/GB2009/000782 filed 25 Mar. 2009, which designated the U.S. and claims priority to GB Application No. 08251250.0 filed 31 Mar. 2008, the entire contents of each of which are hereby incorporated by reference.

FIELD OF THE INVENTION

The present invention relates to data communication. In particular, it relates to the management of an access network including Digital Subscriber Line (DSL) connections.

BACKGROUND TO THE INVENTION

Dynamic Line Management (DLM) is a technique for improving the stability of DSL connections. It is particularly useful when operating DSL connections at close to their maximum speed, because under these conditions external noise affecting the transmitted signal can cause the transceivers to be unable to successfully recover the signal to be transmitted with sufficient reliability to enable the connection to be maintained. If this occurs, the connection needs to be re-established. This is referred to as a re-synch and the user notices a temporary loss of service while the connection is re-established. Re-synchs are generally found to be particularly annoying by end users.

DLM seeks to minimise such re-synchs by automatically analysing DSL connections (especially the rate of occurrence of re-synchs) and varying certain parameters which can affect the likelihood of re-synchs occurring (for example the depth of interleaving, the amount of redundancy built into the encoding used, etc.). Typically, this is done by using a number of different profiles having various different sets of values for the parameters most likely to have an impact on the stability or otherwise of a DSL connection and moving a particular connection between different profiles until a profile is found which has an acceptable stability. The profiles are applied at the local exchange (sometimes referred to—especially in the USA—as the central office) usually within a piece of equipment known as a Digital Subscriber Line Access Multiplexer (DSLAM) which houses a number of DSL transceiver units as is well known in the art.

Typically, the profiles are conceptually able to be thought of as ranging between more aggressive and less aggressive, where the more aggressive profiles tend to provide better services to the user (in terms of especially higher bit rates and lower latencies) but are more likely to result in the line being unstable, whereas less aggressive profiles tend to offer lower bit rates and/or latencies but greater stabilities.

An Alcatel Technology White Paper entitled "Dynamic Line Management for Digital Subscriber Lines" and available at the following URL http://www1.alcatel-lucent.com/com/en/appcontent/apl/18812_DLM_twp_tcm172-228691635.pdf discusses DLM and suggests in overview an implementation in which there is a Validation Phase and an Operations phase. In the validation phase a connection is monitored fairly intensively to identify an appropriate profile for the line and thereafter it is monitored less intensively to ensure that the originally selected profile continues to remain valid.

Co-pending European patent application No. 07250428.5 describes an earlier DLM solution devised by the present applicants in which very unstable data connections are detected in an efficient manner and corrective action is taken within a relatively short period of time whilst data connections which are not very unstable are monitored and transitioned between different profiles based on more thorough monitoring over a longer time-scale.

All of the DLM solutions known to the present applicants have a default profile at which all lines are initially connected (i.e. so called "new provides"). This tends to result in lines initially having a setting which is more conservative than need be the case, in order to prevent poor connections from suffering so many re-synchs as they might otherwise. Furthermore, lines which are very poor are typically nonetheless given a profile which is more aggressive than they can cope with and so the user still perceives many re-synchs and an unstable connection until the DLM process has migrated the line to a more suitable profile.

SUMMARY OF THE INVENTION

According to a first aspect of the invention, there is provided a method of operating an access network including a plurality of connections between end user devices and an aggregation transceiver device where the connections are aggregated for onward connection through the access network, the connections being capable of operating in a rate adaptive data mode or in one or more other modes, the method comprising: storing a plurality of different profiles, each of which specifies a set of one or more values for a corresponding one or more parameters associated with each connection when operating in a data connection mode; and, when initially causing a line to operate in a rate adaptive mode, selecting an initial profile from among the plurality of stored different profiles in dependence upon one or more measurements, or a parameter or parameters derived from one or more measurements, made in respect of the connection whilst operating in another mode.

Preferably, the various modes in which the connections may operate include a rate-adaptive Digital Subscriber Line (xDSL) mode; a non-rate adaptive xDSL mode and a Plain Old Telephone Service (POTS) mode. The xDSL modes are preferably operated in accordance with one or more of the ITU G.992.x standards. Preferably the connections are formed at the physical layer by a copper pair connection.

A rate adaptive mode is preferably one in which a connection has an associated profile specifying one or more parameters including a target signal to noise ratio margin parameter (which parameter is discussed in greater detail below) but which does not specify a fixed bandwidth at which to set up the connection (e.g. at a contractually agreed rate such as 2 Mbits/sec), but rather instead sets up the connection at the fastest rate that it can for the prevailing measured noise (or more precisely the measured signal to noise ratio) in order to satisfy the specified target signal to noise ratio margin. In such a rate adaptive mode, a connection is often more liable to suffer instabilities as it will usually be operating much closer to its maximum capacity than in a fixed rate mode.

Reference to "when initially causing a line to operate in a rate adaptive mode" is intended to include reference to a new provide in that the line is to be changed from operating in either a non-rate adaptive digital mode (e.g. a conventional fixed rate xDSL mode) or in a conventional Plain Old Telephone Service (POTS) mode (or something similar). The method of the present invention may also be applicable to re-provides (i.e. where a line has gone from a rate-adaptive mode, to some other mode and then back to a rate-adaptive mode) although in such cases it would probably be more sensible to use data based on the operation of the line in its former rate adaptive mode than in its non-rate adaptive mode if such data is available. Thus an alternative aspect of the present invention provides a method of operating an access network including a plurality of connections between end user devices and an aggregation transceiver device where the connections are aggregated for onward connection through the access network, the connections being capable of operating in a rate adaptive data mode or in one or more other modes, the method comprising: storing a plurality of different profiles, each of which specifies a set of one or more values for a corresponding one or more parameters associated with each connection when operating in a data connection mode; operating a line in a rate adaptive data mode; storing an indication of the profile applied to the line after a predetermined period of time; operating the line in a mode other than a rate adaptive mode and then subsequently operating the line in a rate adaptive mode once more and selecting a profile to use in the subsequent rate adaptive mode based on the stored indication of the profile applied to the line after operating in the initial rate adaptive mode for a predetermined period of time.

Where, in respect of the first aspect of the present invention, the connection has been operated in a POTS mode, the measurements used to form the basis of a selection of an appropriate initial profile for use when the connection is upgraded to operate in a rate-adaptive xDSL mode preferably include one or more of the capacitance between earth and either or both of the copper lines forming the copper pair connection, the signal attenuation, preferably measured at a selection of different frequencies and averaged to obtain an average attenuation, and an estimate of the length of the copper pair (this may be stored in a database of information about the line or it may be estimated based on attenuation type measurements).

Where, in respect of the first aspect of the present invention, the connection has been operated in a non-rate adaptive xDSL mode, then the measurements used to form the basis of a selection of an appropriate initial profile for use when the connection is upgraded to operate in a rate-adaptive xDSL mode preferably include one or more of an indicated line quality parameter (which is derived from measurements of the stability of the connection when operating in the non-rate adaptive xDSL mode, most preferably measurements of the number of detected errors in the connection and/or of the number of re-synchs of the connection (most preferably automatic or forced re-synchronisations rather than user initiated re-synchs where this information is available) and/or information about the average SNR margin at which the connection was operating and/or the interleave state in which the device was operating) and/or of the number of re-synchs of the connection (most preferably automatic or forced re-synchronisations where this information is available) and/or information about the average SNR margin at which the connection was operating and/or the interleave state in which the device was operating.

Preferably two main parameters which control the operation of xDSL connections are varied to generate different profiles, the Signal-to-Noise Ratio (SNR) margin and the fast/interleave mode.

The SNR margin represents the amount of redundancy built into the selected bit rate (and other connection options) for the connection, given the measured value of the actual SNR experienced by the modem. Thus, each possible set of significant values for the connection parameters (i.e. bit-rate, level of trellis coding, level of interleave, etc.) has a corresponding baseline SNR which represents the minimum value of the SNR at which the connection would be expected to operate with a Bit Error Rate (BER) of $10^{-7}$ (i.e. 1 bit is expected to be in error for every $10^7$ bits); this BER of $10^{-7}$ is called the target rate as the connection is expected to operate very well with this level of BER. The SNR margin represents the amount (in decibels) by which the actual measured SNR exceeds this baseline amount at the time of setting up the connection. Thus the actual received SNR may vary over time, after setting up the connection, below the measured amount at setting up the connection by up to the amount of the margin and still the connection would be expected to operate with a BER of less than or equal to the target amount (i.e. at least as good as the target amount).

The definition of SNR margin which is given in the xDSL standard ITU G992.1 Section 9.5.1 is: "Signal-to-Noise Ratio (SNR) margin: The signal-to-noise ratio margin represents the amount of increased received noise (in dB) relative to the noise power that the system is designed to tolerate and still meet the target BER of 10-7, accounting for all coding (e.g. trellis coding, RS FEC) gains included in the design. The SNR margin ranges from −64.0 dB to +63.5 dB with 0.5 dB steps."

It will thus be appreciated, that the lower the SNR Margin, the higher the headline bit rate that will be achievable (i.e. assuming that there are no errors). Whilst, the higher the SNR Margin, the more likely that the connection will operate in a stable manner, even in a fluctuating noise environment.

Fast/interleave mode switches the depth of interleave between no interleave (FAST mode) and any of the depths of interleave defined in the currently applicable ADSL standards (e.g. the ITU G.992.x standards). In many implementations, only the lowest level of interleave (a depth of 2, where units in a single code word which are adjacent before interleaving are separated by one interleaved unit from another word after interleaving) is used at the moment; however, this may change in the future. As is well known in the art, use of interleave protects against short duration noise spikes by interleaving units (e.g. bytes) of a certain number (depending on the depth of interleave) of code words (each comprising several units) where each code word has a certain amount of error protection such that a relatively small number of errored units per code word can be recovered by the error protection mechanism to recover the original code word completely (e.g. if there are 5 units (e.g. bytes) per code word and the error correction mechanism can recover code words where one unit is errored, an interleave depth of 2 would enable both interleaved words to both be recovered if a noise caused two adjacent units within a two word transmission period to become corrupted). Interleaving provides protection against impulsive noises at the expense of increased latency (and greater buffering requirements of network equipment).

Preferably, in all cases, the different profiles are all stored at the network side (e.g. at the DSLAM) and the network operator has responsibility for selecting the actual profile applied to a connection, though this is usually done at least partially in response to messages coming from the end user's DSL modem. Preferably, the parameters used to determine whether or not a change of profile should be made include the number of times that a re-synch has occurred on a DSL connection within a certain period of time and the number of errored seconds which have occurred within a certain period of time (e.g. within the past 24 hours).

Preferably, the data connections are digital subscriber lines including remote and central transceiver units connected over a copper pair and operating in accordance with one or more of the various xDSL standards agreed by the International Telecommunication Union (ITU) (e.g. G.992.x and their annexes). Preferably the aggregation transceiver device is a Digital Subscriber Access Multiplexer (DSLAM).

Preferably the profiles are ranked according to a level of aggressiveness, where more aggressive profiles are, in general, more likely to result in a connection becoming unstable.

In accordance with the above set out preferred feature of ignoring user initiated re-synchs, the metric of the number of resynchs per unit time is modified to remove (generally speaking, at least some of) the resynchs caused by user action rather than as a result of the line experiencing technical problems or instability, etc, thus providing a more useful metric for use in performing Dynamic Line Management.

An automatic or forced re-synchronisation is one which occurs because errors on the connection cause a complete loss of connection. When this occurs, the end modems revert to an initial state in which a connection is re-established from scratch, rather than trying to rescue the previous connection. This is set out in the various xDSL standards including, in particular, ITU-T G992.1-ADSL1, ITU-T G992.3-ADSL2, ITU-T G992.5-ADSL2+ and ITU-T G994.1-Handshake Procedures for digital subscriber line (DSL) transceivers.

Preferably, determining or estimating the number of forced resynchronisations comprises determining the total number of resynchronisations (in the given period of time of interest) for all reasons, estimating the total number of those resynchronisations caused by a user and subtracting this estimated number of user caused resynchronisations to obtain an estimate for the number of forced resynchronisations.

Preferably, the step of estimating the number of user caused resynchronisations comprises detecting that more than a predetermined minimum period of time prior to or after a resynchronisation has elapsed without a connection having been established and without the line automatically attempting, but failing, to re-establish the connection. Thus if the user simply switches off or unplugs the modem for a period of time greater than the minimum period of time, the resulting re-synchronisation is determined to be a user caused re-synchronisation rather than a forced resynchronisation. Preferably this is achieved by counting the contiguous periods of downtime exceeding the predetermined minimum period within the (longer) given period.

In one embodiment, a record is kept of each 15 minute period (bin) during which there is no connection in place, and the number of sets of contiguous periods in which no connection is recorded as being in place within any 24 hour period (batch) is taken as the estimated number of user caused resynchronisations within that 24 hour period; naturally, in alternative embodiments, different periods of time may be used for the bins or for the batches (e.g. 5 minute period bins and 48 hour batches, etc.). The number of contiguous periods (bins) may conveniently be determined by counting the number of transitions between periods (bins) in which no connections is recorded as being present and periods (bins) in which a connection is recorded as being present.

Further aspects of the present invention relate to systems, devices, computer programs and carrier means or media as set out in the accompanying claims, especially tangible carrier means such as optical storage devices (e.g. compact discs (CD's) or DVD's), or magnetic storage devices such as magnetic discs, or non-volatile solid-state memory devices.

BRIEF DESCRIPTION OF THE FIGURES

In order that the present invention may be better understood, embodiments thereof will now be described, by way of example only, with reference to the accompanying drawings in which.

DETAILED DESCRIPTION OF EMBODIMENTS

Figure 1:
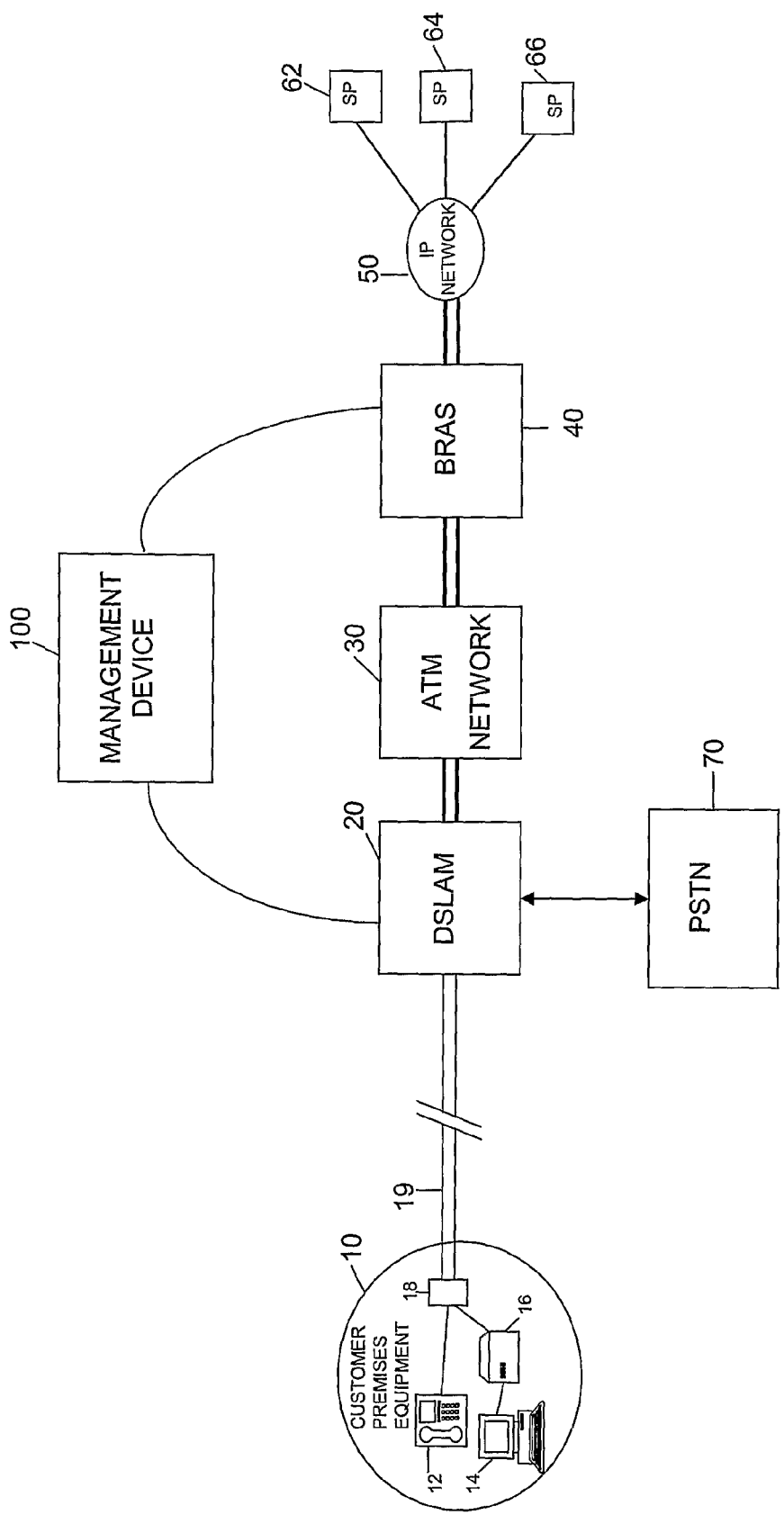
FIG. 1 is a schematic block diagram illustrating a telecommunications network incorporating a management device operating in accordance with a method according to the present invention.

The main embodiment described below uses a management device 100 to perform two principal functions—Broadband Remote Access Server (BRAS) provisioning and Dynamic Line Management (DLM). The BRAS provisioning is described in brief in this application, for the sake of completeness, but it is described in greater detail in co-pending International patent applications GB2006/002826 and GB2006/002818 both filed on 28 Jul. 2006, referred to above, for readers interested in the particulars of the preferred methods of BRAS provisioning applicable to the main embodiment.

As for the DLM function, this is especially desirable in the main embodiment for when the connections are set to operate in a rate adaptive mode in which the downstream (and also the upstream) speed of the ADSL connections controlled by the management device of the main embodiment rate adapts to the highest speed the line can support (from 2 Mb to 8 Mb in the case of the downstream part of the connection). When the ADSL connections are running at their maximum limits they are more susceptible to noise which can cause errors and spontaneous resynchronisations (resyncs).

In overview, the role of the DLM function of the management device is to ensure that the ADSL connections provide a good compromise between the stability of the line and the performance of the line in terms of bit rate (or perhaps more importantly the rate at which a user can receive desired data—after any lost packets caused by errors have been re-sent, for example) and latency. The DLM function does this by receiving data from DSLAM Data Collectors each day and processing this received data. The DLM function is then able to increase or decrease the noise margins (i.e. the SNR margins) and/or interleave levels as required by setting a new profile for each ADSL connection (using the existing provisioning systems for setting profiles at DSLAM's). This basic functionality is enhanced with logic to minimise churn or oscillation of profiles (by attempting to stabilise the DSLAM profile for each connection, rather than reacting to every relevant change in the environment of the connection which could cause the maximum stable profile applicable to change).

Note that in the present embodiment, the DLM function operates both in respect of rate adaptive and non-rate adaptive mode connections. The data generated by the DLM function in respect of non-rate adaptive mode connections is particularly useful for helping to select an initial profile for the connection when/if it is upgraded to operate in a rate-adaptive mode. In fact, given that connections operating in a non-rate adaptive mode are often able to operate successfully at the contracted rate (e.g. 2 MB) at a very conservative profile, the DLM function is often redundant in terms of improving the stability of the connection, however, being able to use the information obtained from the DLM function in order to select a sensible initial profile for the connection when it is upgraded to a rate adaptive mode is an important reason for performing the DLM function even in respect of non-rate adaptive mode connections.

Main Embodiment

Referring to FIG. 1, a first embodiment of the present invention is illustrated in overview. A copper pair loop 19 (which forms part of the access network which extends between customer premises equipment 10 and the BRAS 40) connects customer premises equipment 10 to a DSLAM 20 located within a local exchange (also known as a central office in the US). The DSLAM separates normal voice traffic and data traffic and sends the voice traffic to the Public Switched Telephone Network (PSTN) 70. The data traffic is passed on through an Asynchronous Transfer Mode (ATM) network 30 which forms the remainder of the access network 19, 20, 30 (in the present embodiment, the ATM network 30 is British Telecom (BT)'s Multi Service intranet Platform (MSiP) ATM network). Connected to the ATM network 30 is a Broadband Remote Access Server (BRAS) 40 at which several IP traffic flows or ATM circuits from (and to) multiple Service Providers (SP's) 62, 64, 66 are aggregated (and disaggregated) via an IP network 50 (which in this case is BT's Colossus IP network)—which itself may run over an ATM network or networks. Within the customer premises equipment 10, there is an ADSL splitter filter 18, a telephone 12, an ADSL modem 16 and a computer 14.

In some cases the first hop of an IP packet travelling from computer 14 towards an ISP 62, 64, 66 would be the BRAS 40; whereas in other cases the first hop from an IP perspective could be beyond the BRAS 40.

In all cases, the end user's modem 16 creates a Point-to-Point Protocol (PPP) session from the modem to another device in the network. This is a logical end to end connection that carries the end users traffic from the modem to the target IP network.

In some cases (e.g. in BT's Central+ product), the PPP session is terminated on the BRAS, and then onward routed directly onto the Internet (e.g. via a core IP network such as BT's Colossus network).

In one example configuration where the PPP session is not terminated at the BRAS 40, the PPP session is terminated on a "home gateway" at the edge of the core network, connected to the Service Provider (SP). In another example configuration (e.g. such as in the BT central product) a Layer 2 Tunneling Protocol (L2TP) tunnel is used to pass through the BRAS 40 to a terminating BRAS which belongs to the SP; the L2TP tunnel tunnels all the PPP sessions into the SP network for them to handle as they want.

In all cases, the first IP hop is from the end user to the terminating BRAS (i.e. over the PPP connection). Furthermore, in all cases, the BRAS 40 is responsible for policing the amount of traffic flowing downstream (i.e. from the network towards the customer premises equipment) towards each line connected to the BRAS 40, to ensure that it does not exceed a maximum amount provisioned for that line. This policing is either done at the IP layer (where the BRAS 40 terminates a PPP connection from the customer premises equipment 10) or at a lower level (e.g. at the ATM layer) where there is some sort of sub-IP layer tunneling through the BRAS 40.

The above mentioned arrangement of items 10, 19, 20, 30, 40, 50, 62, 64, 66 and 70 is conventional. However, in addition to this conventional arrangement, in the present embodiment there is a management device 100 which communicates with both the DSLAM 20 and the BRAS 40. The detailed operation of this device (especially as regards its DLM function) is explained in greater detail below with reference to FIGS. 2 and 3. However, in overview it obtains information from the DSLAM 20 about the rate at which each Digital Subscriber Line (DSL) connects to the DSLAM (or, in the case of non-rate adaptive connections, the rate at which the connection could in theory according to the respective DSL modems connect if they were operating in a rate adaptive mode) and information about events such as detected errors and/or resyncs occurring on the line/connection and modifies the operation of the DSLAM's as regards the aggressiveness of the profile used by a respective DSLAM for a respective DSL connection.

Figure 2:
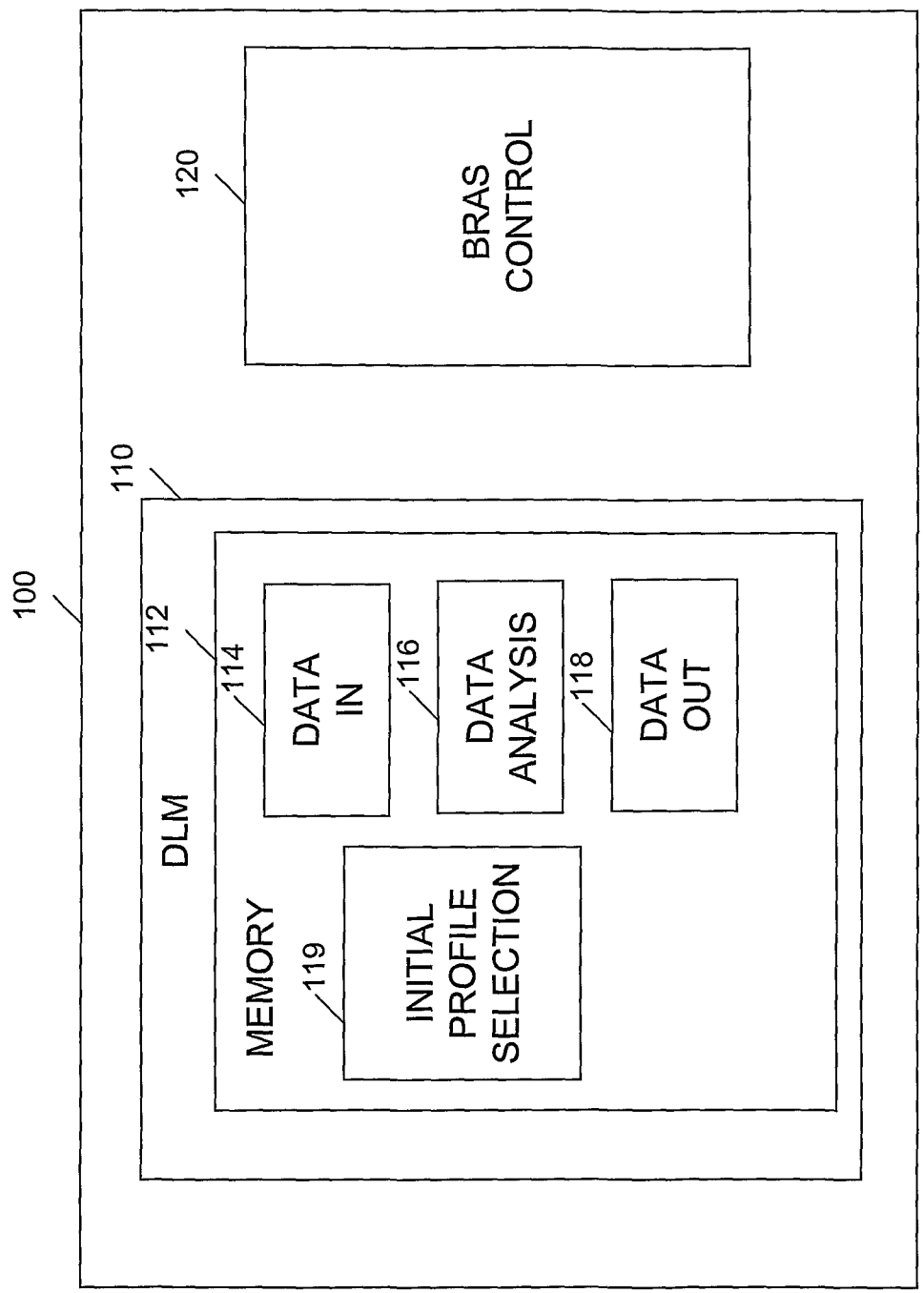
FIG. 2 is a schematic block diagram illustrating the management device of FIG. 1 in more detail.

As shown in FIG. 2, the management device 100 comprises two main functional parts, a BRAS provisioning or BRAS control function 120 and a Dynamic Line Management (DLM) function 110.

The BRAS provisioning function 120 processes part of the information received from the DSLAM's to assess a consistent connection speed achieved by each DSL connection which is operating in a rate-adaptive mode. If it determines that this consistent rate has increased as a result of recent higher rate connections, it instructs the BRAS to allow higher through flows of traffic for that DSL. On the other hand, if it detects that a particular connection speed is below the stored consistent value, it reduces the consistent value to the current connection rate and immediately informs the BRAS of the new consistent value rate so that the BRAS does not allow more traffic to flow to the DSL than the DSL is currently able to cope with.

Precise details of some of the algorithms which may be used by the BRAS Control function 120 of the management device 100 to calculate a consistent rate in the present embodiment are described in copending International applications GB2006/002826 and GB2006/002818. However, it should be noted that the intention of these algorithms are to arrange that the user will receive data at the highest rate which his/her DSL is consistently able to obtain without requiring the BRAS to be reconfigured every time the DSL is connected at a new maximum rate. At the same time the algorithms seek to ensure that if a DSL connects at a rate which is below that at which the BRAS is currently configured to allow data through for that DSL, then the BRAS is quickly reconfigured to avoid overloading the DSLAM. The BRAS control function plays no part in respect of connections operating at a fixed rate (i.e. in a non-rate adaptive mode) since the BRAS does not need to be re-configured for such connections.

Details of the particular algorithm employed in the present embodiment by the DLM function are set out below. In overview however, a DLM data receiving sub-function receives a new file daily from each element manager containing up to 96 timeslots (15 minute period) per DSL connection per day. This data is used in a DLM analysis sub-function to determine if changes to the DSLAM profile are required to stabilise the end users service to comply with either a default stability level or, if present, a stability level or policy specified for the particular connection. If changes are required, a DLM output sub-function sends a request to the Operational Support System (OSS) of the access network for the profile applied to the line to be changed. The precise way in which this is performed will depend on the details of the OSS of the particular access network and is not relevant to the present invention and so will not be described further herein.

In addition, in the event that a connection is to be upgraded from a non-rate adaptive mode (either a POTS mode or a fixed rate xDSL mode) to a rate-adaptive mode, the DLM function includes an initial profile selection sub-function which selects an initial profile for the connection based on one or more measurements or derived parameters associated with the connection. The precise operation of this sub-function is described below with reference to FIG. 3.

Each of the DLM sub-functions mentioned above is implemented by standard computer processor components operating in accordance with software code modules stored in a memory 112 forming part of the DLM function 110; in particular, a DLM data receiving code module 114 (DATA IN) causes implementation of the DLM data receiving sub-function, a DLM analysis code module 116 (DATA ANALYSIS) causes implementation of the DLM analysis sub-function, a DLM output code module 118 (DATA OUT) causes implementation of the DLM output sub-function and a DLM initial profile selection code module 119 (INITIAL PROFILE SELECTION) causes implementation of the initial profile selection sub-function.

The main source of input data for the DLM function is a daily file from each element manager, giving an aggregated report of each line's activity over the preceding 24 hours. This results in a change in DSLAM profile being applied no more frequently than once every 24 hours which is advantageous because it avoids the possibility of the DSLAM being reconfigured every time a line re-syncs.

Each time a line is checked to see if its profile should be changed (which in the present embodiment occurs once every 24 hours as part of a batch processing function), the daily file data is processed and the data for the respective line being analysed is compared with the threshold values set for that line in dependence upon the stability level associated with the line. If the comparison indicates that a transition should be made, then a corresponding instruction is issued to the OSS system for a corresponding transition to be made.

The DSLAM profile has two parameters which are adjusted in the various different profiles available for the DLM function to choose between in order to improve the stability of the line or conversely to improve the bit-rate or low-latency of the connection: the target margin and the run mode (the latter enabling the use of interleaving). The default line profile which is initially applied to any brand new lines for which no previous operational measurements are available (i.e. where a new physical connection has been installed) has a target margin of 6 db and interleaving disabled (often referred to as being in fast mode). All other lines have an initial profile selected by the initial profile selection sub-function as discussed below. Changing these parameters by moving to different profiles is based on two performance metrics in the present embodiment, errors (in particular, in this embodiment, errors caused by code-violations) and re-trains (i.e. re-syncs).

The number of errors and re-trains is normalised to up-time (total synchronised time during the period) to form the actual performance metrics used to determine the stability of the line. For example 100 errors in 10 hours of up-time after normalisation is (quite sensibly) very different from 100 errors in 1 minute of up-time. The normalisation is performed by calculating a mean-time-between either errors or re-synchs. Furthermore, in the present embodiment, the re-trains parameter is also processed, prior to use as a stability performance metric, by discounting the number of resynchs deemed to be user-caused resynchs, prior to calculating the mean-time-between resynchs. In the present embodiment, this is achieved using the following method, as specified below according to the following pseudo-code:

[Note the following assumes that an array uptimes[ ] has been formed and populated, such that each element in the array corresponds to one of the 96 15-minute bins per 24-hour period (in the present embodiment) for a particular DSL connection—the type of the array (i.e. 1 bit numbers, 1 byte integers, short integers, floating numbers, etc.) is unimportant so long as where an element of the array is zero it indicates zero uptime in the corresponding bin and a non-zero value indicates that there was at least some uptime in that bin—if 1-bit values are used they may be considered as taking either a True or a False value, in which case one of these should be used to indicate zero uptime instead of zero—however, in the present embodiment, each element comprises a short integer between 0 and 900 specifying the number of seconds of uptime in the respective 15-minute (i.e. 900-second) bin.]

\*\*\* Comment—method to count number of unforced re-trains in a 24-hour period for a given connection

```
SET unforcedretrains = 0
FOR (i = 0 to 95) (
    IF (uptimes[i] = 0 AND uptimes[i+1] != 0) THEN unforcedretrains++
    )
RETURN unforcedretrains.
```

The above pseudo-code basically says to check each bin and determine if it has zero uptime whilst the subsequent bin has non-zero uptime (i.e. detecting a transition from a bin with no uptime to a bin with some uptime) and for each such transition to increment the variable unforcedretrains which thus keeps a running total of the number of (assumed-to-be) user-caused re-synchs. This value is then subtracted from the total number of retrains detected for the respective connection within the 24 hour period to obtain an estimated number of forced retrains for the 24-hour period and then the total uptime in seconds is divided by the estimated number of forced retrains to obtain an estimated mean time between re-trains in seconds. In the present embodiment, the uptimes[ ] array stores the number of seconds of uptime in each bin so that it is easy to obtain the total uptime for the connection by simply summing the values of all of the elements in the array.

Having calculated the metrics to be used in assessing the stability of the line, a check is made against thresholds, etc. and if it is deemed necessary or desirable a change in profile is made.

In general, if a move to a less aggressive profile is deemed necessary, a move over to an interleaved profile is made in preference to an increase in the target margin. Initially an interleaved profile is set with the same corresponding target margin as the previous fast mode profile (i.e. 6 dB fast would transition to 6 dB interleaved).

If a customer has opted-out of the option to apply interleaving (e.g. because low latency is more important to them than maximum bit-rate—such as is often the case for customers who are on-line gamers or VoIP or video conference users) then transitions are only made between fast mode profiles (only the target margin is varied). This clearly limits the capability of the DLM process.

Before a transition is made, a check is made against line rate to ensure that a line is capable of making the transition to a new profile without suffering a bit rate drop so drastic that it would fall below a predetermined minimum acceptable bit rate. A transition is only made if there is some confidence that the line will be capable of supporting service above this minimum acceptable rate once the new profile is applied. For example, in the present embodiment a transition to a higher noise margin profile is only made if the current bit rate is approximately 800 kbps greater than a Fault Threshold Rate (FTR) (the FTR represents the minimum acceptable bit rate as determined by the network operator—in the present embodiment, the network operator is a wholesaler of network services and supplies these services to network retailers, or Service Providers, who in turn supply consumers; the Maximum Stable Rate is a parameter which is determined by the wholesaler network operator and provided to the service provider as an indication of the estimated capability of the line, the FTR is related to the MSR but is set below this and is used to trigger a fault report if the connection rate ever falls below the FTR since this is an indication that the line is performing significantly below the rate that it is believed to be capable of operating at). If the line is unstable and yet cannot make the transition because it would drop below its minimum acceptable bit rate (i.e. the FTR), then this is flagged for further investigation. In the present embodiment, the FTR is initially set at 2 Mbs and is then re-set to 80% of the Maximum Stable Rate detected by the network during the first 10 days of operation of the DSL in its rate adaptive mode.

If a line fails to synchronise then a transition will be made to a lower target margin. If this means returning to a previously unstable state then this is flagged for further investigation as the line is not effectively stabilised (even though it isn't at the maximum target margin). The line is returned to the previous unstable state so that some level of service can be provided to the customer whilst an investigation takes place.

If a line fails to synchronise even at the lowest target margin then it is flagged for investigation. For example, it may not be able to support the required service or the line may be faulty.

Similarly, if a line is still unstable at the maximum possible target margin then it is flagged for further investigation. For example the line may be faulty.

If a line is completely stable then in general the DLM function moves the line to a lower target margin (or interleave depth) to increase the available capacity (or reduce the latency) on the line (remember 3 dB≈800 kbps). However, these transitions are handled carefully to avoid frequent changes in target margin (or interleave depth) up and down. Thus if a line has previously been moved from a more aggressive lower target margin (or less interleaved) profile to the current target margin (and interleave depth), it must wait a considerably longer time (e.g. a week, or a month) before being re-transitioned back to the lower target margin (or interleave depth) profile than if it has not previously been moved back from the lower target margin (or interleave depth) profile.

In the present embodiment, there is a manual process to enable the transition between any line profile (e.g. 3 dB fast straight to 15 dB interleaved is possible by manual intervention).

In the present embodiment, those lines, which have been flagged for further investigation are pro-actively repaired in the hope that they can be repaired before any fault report is generated.

Re-profiling requests to move to a less aggressive profile can occur on a daily basis. Re-profiling decisions on stable lines to move to a more aggressive profile to increase overall capacity are made over a longer time period (which generally increases with the number of times that the line has previously been moved off the target profile because of lack of stability issues) as discussed in the preceding paragraph.

In the present embodiment, each line is categorised by the first sub-function of the DLM function into one of four different categories in dependence upon the normalised number of errors and/or re-syncs as reported to the DLM function in the bulk file. The categories correspond to very poor, poor, acceptable and very stable.

The basic flow of the DLM process is shown in Table 1 below.

TABLE 1

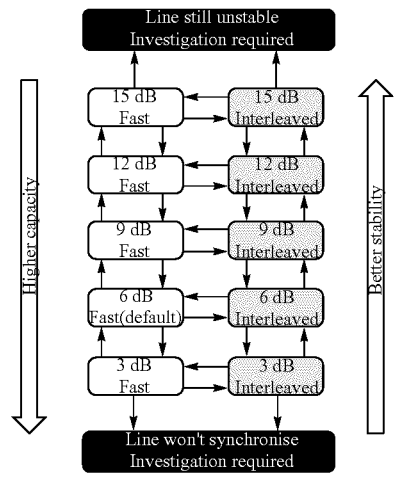

In the present embodiment, the general progression through the profiles shown in Table 1 is as follows: if a line is to be changed to a more stable profile, the first change is to move to the profile with the same target margin but in interleaved mode instead of fast mode, if the line is already in an interleaved mode, then the line is moved to the next higher target margin profile also in interleaved mode. If the line is to be moved in the direction of increased capacity, it is kept in the same mode (i.e. fast or interleaved) but moved to the next lower target profile, unless it is at the minimum target margin in interleaved mode, in which case it is moved to the minimum target margin profile in fast mode.

In the second sub-function of the DLM function, a line categorised as very poor is immediately moved two steps in the better stability direction (e.g. from 6 dB Fast profile it would move to 9 dB Interleaved, from 6 dB Interleaved it would move to 12 dB Interleaved, etc.). A line categorised as poor is immediately (although with lower priority than the re-profiling of any very poor categorised lines) moved one step in the better stability direction (e.g. from 6 dB Fast to 6 dB Interleaved or from 9 dB interleaved to 12 dB Interleaved). A line categorised as acceptable is maintained on its current profile (i.e. no action is taken). A line categorised as very stable is moved (if the further requirements to avoid oscillations etc. are also satisfied) one step in the higher capacity direction (e.g. from 6 dB Fast to 3 dB Fast, from 9 dB Interleaved to 6 dB Interleaved or from 3 dB Interleaved to 3 dB Fast).

In the present embodiment, each line is processed once every 24 hours to determine how the line should be categorised, and thus if a new profile should be selected for that line. In order to avoid frequent oscillations between adjacent profiles, a good and a bad delay counter are used to place a delay on how quickly a line is reprofiled. Thus, every time a line is categorised as good a good delay counter is incremented (and a poor delay counter is decremented) and only once the good delay counter has reached a good threshold (which in the present embodiment is set to 13) is a request made to the OSS for the profile to be increased by one step to a more aggressive level, and then the delay counters are reset. Furthermore, every time a line is categorised as poor, a poor delay counter is incremented (and the good delay counter is decremented) and only once the poor delay counter reaches a poor threshold (which in the present embodiment is set to 3) is its profile dropped by one step to a less aggressive level. The delay counters are never decremented below 0 such that even if a line has experienced a number of good days (such that the poor delay counter has been decremented to zero, e.g. five good days in a row) only 3 days in a row of the line behaving poorly are required for the poor threshold to be reached causing a re-profiling. Furthermore, a delay doubler is used to increase the delay (i.e. by increasing the good threshold) required before a line which has moved down from a more aggressive profile to a less aggressive profile level is allowed to re-transition back up to the more aggressive level. The delay doubler is therefore incremented (in the present embodiment up to a maximum of 5) whenever the line is re-profiled to a less aggressive level and then the delays are reset (as in the case where the line is re-profiled to a more aggressive level). Resetting the delays is done according to the following formulas:

GOOD THRESHOLD=DEFAULT GOOD THRESHOLD*2EXP(DELAY DOUBLER)

POOR DELAY COUNTER=GOOD DELAY COUNTER=0

The DEFAULT GOOD THRESHOLD is set in the present embodiment to 13 (i.e. equivalent to 14 days), the DEFAULT POOR DELAY is set in the present embodiment to 3 (i.e. equivalent to 3 days) and the DELAY DOUBLER is set to 0, thus the initial good delay is 13 but each time the line's profile is transitioned to a less aggressive profile the DELAY DOUBLER is incremented until after 5 such transitions, each time the DELAY is reset it is reset to a value of 448 (i.e. equivalent to approx 14 months). In the present embodiment, if a user's stability policy or level is changed the delay doubler is reset back to zero; furthermore, the delay doubler and even the delay counter may be manually reset by an operator to cater for exceptional circumstances.

Note that the amount of delay before moving a line to a more aggressive profile employed in the present embodiment as described above synergises very well with the initial profile selection of the present embodiment since otherwise a user could wait much longer than necessary to be moved to an appropriately aggressive profile if he/she happens to have a very good connection.

In the present embodiment, the specific functionality of the DLM function to select an initial profile for lines being newly upgraded to operate in a rate adaptive xDSL mode, is now described below.

Figure 3:
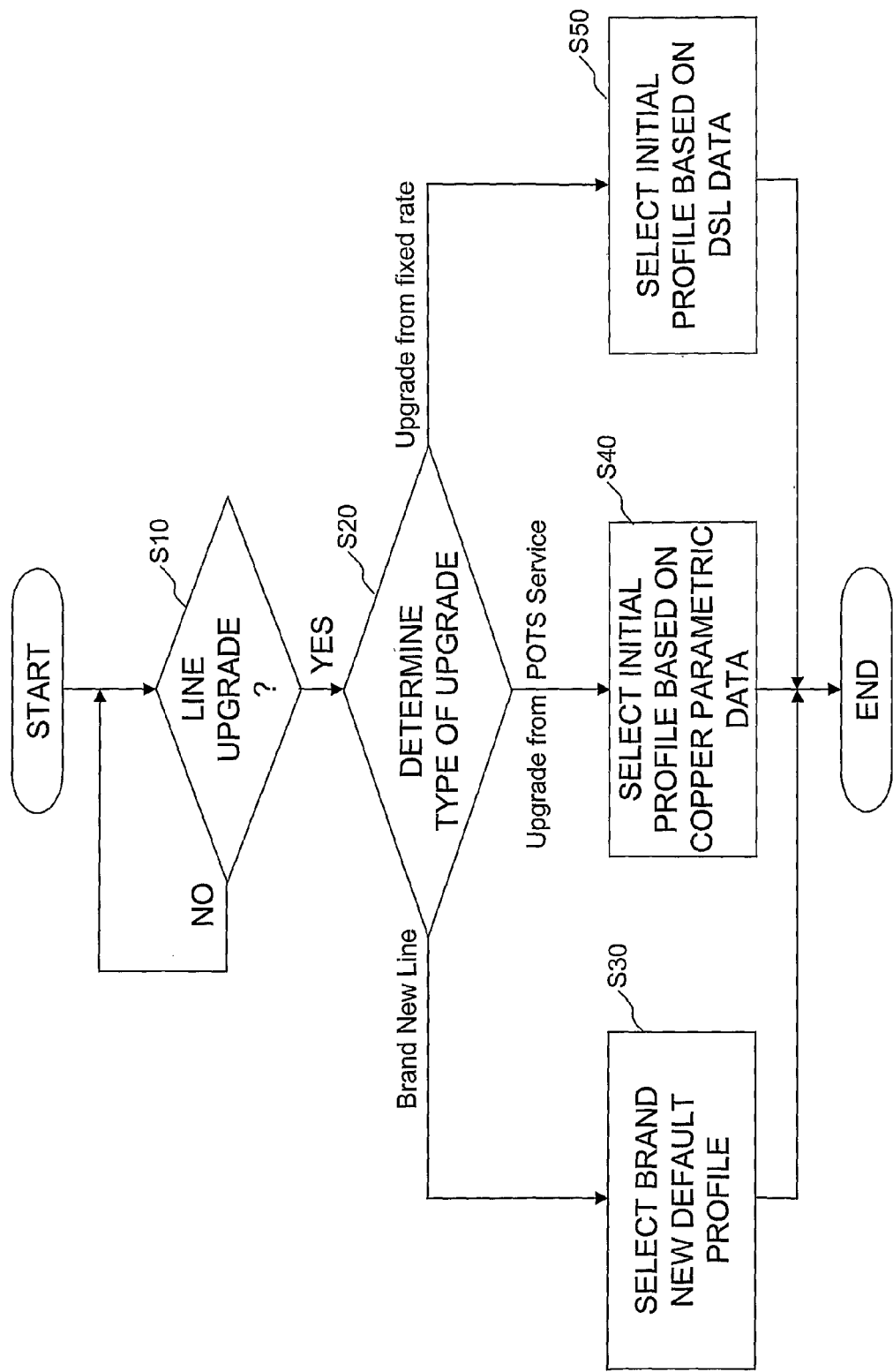
FIG. 3 is a flow diagram illustrating the steps carried out by the management device of FIG. 1 in order to control the initial DLM profile applied to a connection in the network of FIG. 1 which is being upgraded to operate in a rate adaptive xDSL mode.

In overview, with reference to FIG. 3, the initial profile selection sub-function commences at step S10 when a line requiring new rate adaptive service is detected. When such a line is detected the method proceeds to step S20 in which it is determined the type of upgrade of the connection. If it is detected as a brand new line (i.e. a new physical copper connection over which now type of service has been running historically) then the method proceeds to step S30 in which the default profile for brand new lines is set for the line—in the present embodiment this is a profile with 6 dB SNR target margin and interleave off. If at step S20 it is detected that the line is being upgraded from a POTS service, then the method proceeds to step S40 in which an initial profile for the line is selected based on historical copper parametric data as collected by the OSS system of the access network. If at step S20 it is detected that the line is being migrated from a non-rate adaptive xDSL profile, then an initial profile is selected based on historical dsl data stored about the line. Upon completion of step S30, S40 or S50 as appropriate, the method ends.

This method is expounded upon below with separate discussion of upgrades from POTS connections (and brand new lines) and migrations from non-rate adaptive dsl connections.

Initial Profile Selection for New Provides Coming from a POTS Service

For new provides (i.e. a line without any existing broadband service), The DLM function does not have any historic DSL based data to base a profile selection on, so the profile selection is based on the copper parametric data. There may be some times where a line requires a copper line installation and there there is no data to base a selection on, so the default provisioning profile (of 6 dB SNR target margin with interleaving off) is used.

Example Calculation for Determining a New Provide IPS Calculation

The following is a hierarchical algorithm to determine the profile; running through each step

```
Use Capacitance Balance function :
If "A leg to Earth Capacitance" and "B leg to Earth Capacitance" are not null then
If "AE Capacitance" < "BE Capacitance", then Balance = "AE Capacitance" / "BE
Capacitance"
If "AE Capacitance" > "BE Capacitance", then Balance = "BE Capacitance" / "AE
Capacitance"
Lookup Balance
IF Balance >= 0.95              margin = default,     interleaver = off
IF 0.86 <= Balance <= 0.94      margin = default,     interleaver = on
IF Balance < 0.85               margin = 1 step up from default,    interleaver = on
end Balance
Use Attenuation rule, from "Line Characteristics Feature Set":
Attenuation function.
    If "Measured dB Loss" is not null, then
        If "Measured dB Loss" > (medium)dB, then interleaver = on
        If "Measured dB Loss" > (high)dB, then margin = default, interleaver = on
    exit
    If "Calculated dB Loss" is not null then
    If "Calculated dB Loss" > (medium)dB, then interleaver = on
    If "Calculated dB Loss" > (high)dB, then margin = default, interleaver = on
    exit
    if "AE Capacitance" and "BE Capacitance" are not null then
```

```
if "AE Capacitance" > "BE Capacitance" then:
    If "AE Capacitance" > 220nF, then interleaver = on
    If "AE Capacitance" > 350nF, then margin = 6, interleaver = on
    exit
else
    If "BE Capacitance" > 220nF, then interleaver = on
    If "BE Capacitance" > 350nF, then margin = 6, interleaver = on
    exit
If "Line Length Estimate" is not null
    If "Line Length Estimate" > 3200m, then interleaver = on
    If "Line Length Estimate" > 4800m, then margin = 6, interleaver = on
    exit
end attenuation
Interleaving option function
    if interleaving option = A, exit
    if interleaving option = I, interleaving = on, exit
    if interleaving option = O, interleaving = off, exit
end Interleaving option
```

IPS for Migrations

When performing IPS for migrations (i.e. from a non-rate adaptive xDSL mode connection), it is possible to retrieve the historic DSL data in order to have a higher confidence level with the initial profile selection.

Figure 4:
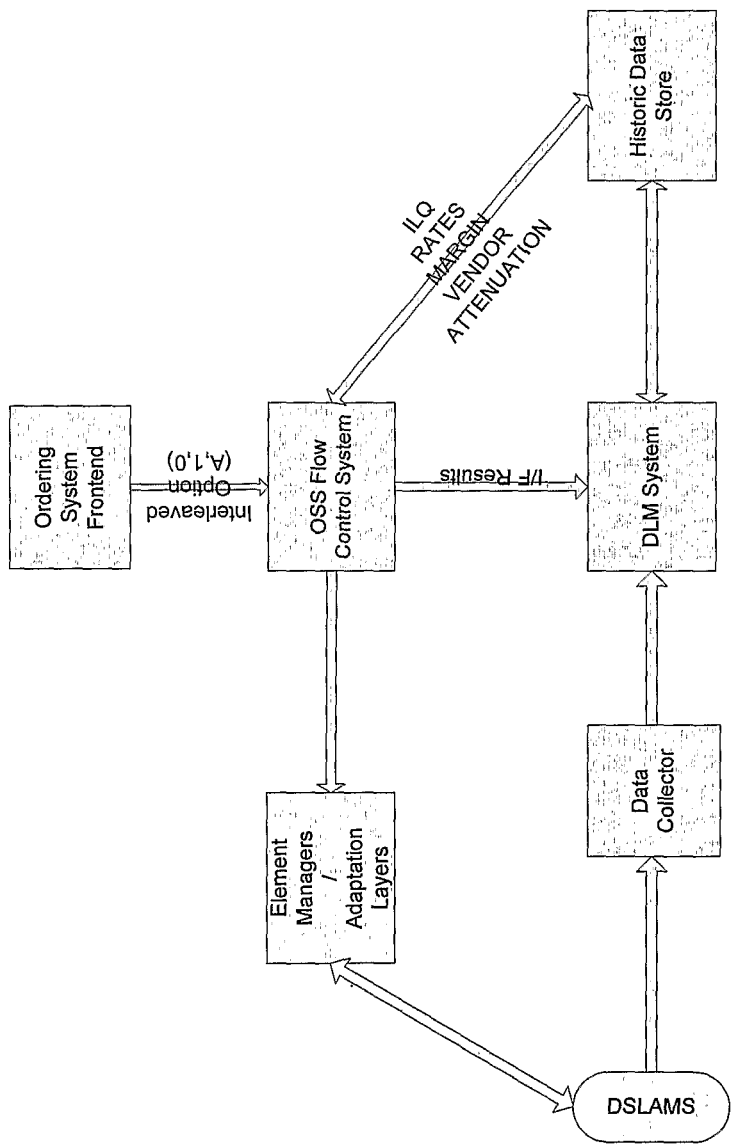
FIG. 4 is a schematic illustration of the network operating to select an initial profile for a connection being upgraded from a non-rate adaptive xDSL connection to a rate adaptive xDSL connection.

Referring now to FIG. 4, when a migration order to a DLM product is passed into the provisioning system via the ordering gateway 410, the order is placed along with the interleaving options for the line (Automatic—let the system decide what is best, I—Always interleave, O—Never interleave). This is passed into the OSS 430 where a Historic data store 440 is queried for the DLM indicated line quality (a stability metric from DLM 100), the current rate, attenuation, margin and DSLAM vendor for the respective connection (this information having been obtained by processing of the data sent to the DLM 100 via the Data collector(s) 425). The OSS flow control system 430 then uses a lookup table based on data provided from analysis of the DLM data and historical reprofiling analysis (resulting in the present embodiment in Table 1 shown below) to determine from the retrieved data which profile the line should be configured with. This is then passed to a second table (Table 2—Attenuation IPS over-ride) with an override for the attenuation, and finally the interleaving permission overrides the recommended profile as necessary. This profile is then sent through the Element Managers/Adaptation Layers 420 of the OSS to the respective DSLAM 20 and the line is migrated to the new profile.

TABLE 1

ILQ/Vendor IPS Lookup

| VENDOR | ILQ | Profile |
|---|---|---|
| VENDOR1 | Poor | 6 interleaved |
| VENDOR1 | Acceptable | 6 fast mode |
| VENDOR1 | Very stable | 3 fast mode |
| VENDOR2 | Poor | 6 interleaved |
| VENDOR2 | Acceptable | 6 fast mode |
| VENDOR2 | Very Stable | 3 fast mode |
| VENDOR3 | Poor | 9 interleaved |
| VENDOR3 | Acceptable | 6 interleaved |
| VENDOR3 | Very Stable | 6 fast mode |

TABLE 2

Attenuation IPS override

| Attenuation | Profile |
|---|---|
| >43 dB | Turn on interleaving |
| >60 dB | 9 interleaved |

Note that these tables are illustrative only and these values may clearly be changed depending on the particular DSLAM's used etc. Indeed where a network operates different models of DSLAM but from the same vendor, these are preferably provided with their own entries in Table 1 etc.

Variations

As a slight variant on the above described process, an AGGRESSIVE PROFILE flag can be used to track when a reprofiling has been made in the more aggressive direction, and the delay doubler may be incremented only if a reprofiling has occurred in the less aggressive direction (immediately) after a reprofiling has been made in the more aggressive direction. This helps to increase the delay before which a more aggressive transition can be made only if there is evidence of oscillation between different profiles. This functionality may be implemented by including an additional step after (i.e. upon completion of) step S90 to set the AGGRESSIVE PROFILE flag to true (from a default setting of false); and by amending step S60 such that the delay doubler is only incremented if the AGGRESSIVE PROFILE flag is set to true, and then resetting the AGGRESSIVE PROFILE flag back to false after incrementing the delay doubler.

In alternative embodiments, different methods could be used to distinguish user-caused re-trains and forced re-trains. For example, some special software could be installed on the user modem end (i.e. either to run on the user's p.c. connected to the end-user DSL modem, or to run on the DSL modem itself) to detect whenever the modem is seemingly disconnected by the user (e.g. by detecting that power to the modem has been lost—e.g. because the user has switched off the modem or disconnected the power cable, etc; or by detecting that a telephone cable has been unplugged, etc.). Moreover, the various ADSL standards even specify as an optional requirement that the ATU's (i.e. the ADSL modems) should monitor for a loss of power and report this if requested. Unfortunately, this feature has not been widely implemented yet by manufacturers of ADSL modems. For this reason, the approach described in the preferred embodiment above of looking for transitions betweens periods in which no connection is detected as being present and periods in which a connection is detected as being present is preferred because it can be done with common existing modems without any modifications to the modems or the users' pc's (or the software running thereon).

The invention claimed is:

1. A method of operating an access network including a plurality of connections between end user devices and an aggregation transceiver device where the connections are aggregated for onward connection through the access network, the connections being capable of operating in a rate adaptive data mode or another mode, the method comprising:

storing a plurality of different profiles, each of which specifies a set of one or more values for a corresponding one or more parameters associated with each connection when operating in a data connection mode, the stored profiles including a plurality of rate-adaptive profiles specifying a target signal to noise ratio margin parameter but not specifying a fixed bandwidth at which to set up the connection, and a plurality of non-rate-adaptive profiles specifying a fixed bandwidth at which to set up the connection; and, when initially causing a line to operate in a rate-adaptive mode, selecting an initial rate-adaptive profile from among the plurality of stored different profiles in dependence upon one or more measurements, or a parameter or parameters derived from one or more measurements, made in respect of the connection while operating in said another mode, said another mode being a non-rate-adaptive mode operating in accordance with one of said non-rate-adaptive profiles specifying a fixed bandwidth at which to set up the connection, the fixed bandwidth being at a predetermined rate as specified in the profile whereby if the specified fixed bandwidth cannot be achieved no connection is made.

2. A method according to claim 1 wherein the modes in which the connections operate include a rate-adaptive digital subscriber line mode as the rate-adaptive mode and a non-rate adaptive digital subscriber line mode as the non-rate-adaptive mode.

3. A method according to claim 2 wherein the aggregation transceiver device is a Digital Subscriber Line Access Multiplexer comprising a plurality of central transceiver units operating in accordance with a digital subscriber line standard.

4. A method according to claim 1 wherein the another mode is a non-rate-adaptive digital subscriber line mode so that a line is upgraded from the non-rate-adaptive digital subscriber line mode, and the initial profile selection is made based on digital subscriber line historic data.

5. A management device for use in an access network including a plurality of connections between end user devices and an aggregation transceiver device where the connections are aggregated for onward connection through the access network, the connections being capable of operating in a rate-adaptive data mode or in another mode, the device comprising:

a data store storing a plurality of different profiles, each of which specifies a set of one or more values for a corresponding one or more parameters associated with each connection when operating in a data connection mode, the stored profiles including a plurality of rate-adaptive profiles specifying a target signal to noise ratio margin parameter but not specifying a fixed bandwidth at which to set up the connection, and a plurality of non-rate-adaptive profiles specifying a fixed bandwidth at which to set up the connection; and initial profile selection means for, when a line is to be caused to operate in a rate-adaptive mode, selecting an initial rate-adaptive profile for the line from among the plurality of stored different profiles in dependence upon one or more measurements, or a parameter or parameters derived from one or more measurements, made in respect of the connection while operating in said another mode, said another mode being: a non-rate-adaptive mode operating in accordance with one of said non-rate-adaptive profiles specifying a fixed bandwidth at which to set up the connection, the fixed bandwidth being at a predetermined rate as specified in the non-rate-adaptive profile whereby if the specified fixed bandwidth cannot be achieved no connection is made.

6. An access network including a management device according to claim 5.

7. A non-transitory computer-readable storage medium storing a computer program or programs for carrying out steps during execution of the program or programs by a computer system, the steps comprising:

storing a plurality of different profiles, each of which specifies a set of one or more values for a corresponding one or more parameters associated with each connection when operating in a data connection mode, the stored profiles including a plurality of rate-adaptive profiles specifying a target signal to noise ratio margin parameter but not specifying a fixed bandwidth at which to set up the connection, and a plurality of non-rate-adaptive profiles specifying a fixed bandwidth at which to set up the connection; and when initially causing a line to operate in a rate-adaptive mode, selecting an initial rate-adaptive profile from among the plurality of stored different profiles in dependence upon one or more measurements, or a parameter or parameters derived from one or more measurements, made in respect of the connection while operating in said another mode, said another mode being: a non-rate-adaptive mode operating in accordance with one of said non-rate-adaptive profiles specifying a fixed bandwidth at which to set up the connection, the fixed bandwidth being at a predetermined rate as specified in the non-rate-adaptive profile whereby if the specified fixed bandwidth cannot be achieved no connection is made.

8. The medium according to claim 7 wherein the rate-adaptive mode is a rate-adaptive digital subscriber line mode, and the non-rate-adaptive mode is a non-rate-adaptive digital subscriber line mode.

9. The medium according to claim 8 wherein the aggregation transceiver device is a Digital Subscriber Line Access Multiplexer comprising a plurality of central transceiver units operating in accordance with a digital subscriber line standard.

10. The medium according to claim 7 the non-rate-adaptive mode is a non-rate-adaptive digital subscriber line mode, and the initial profile selection is made based on digital subscriber line historic data.

11. A system for use in an access network including a plurality of connections between end user devices and an aggregation transceiver device where the connections are aggregated for onward connection through the access network, the connections being capable of operating in a rate-adaptive data mode or in another mode, the system comprising:

a data store storing a plurality of different profiles, each of which specifies a set of one or more values for a corresponding one or more parameters associated with each connection when operating in a data connection mode, the stored profiles including a plurality of rate-adaptive profiles specifying a target signal to noise ratio margin parameter but not specifying a fixed bandwidth at which to set up the connection, and a plurality of non-rate-adaptive profiles specifying a fixed bandwidth at which to set up the connection; and a computer processing system, comprising a computer processor, configured to:

when a line is to be caused to operate initially in a rate-adaptive mode, select an initial profile for the line from among the plurality of stored different profiles based on at least one measurement, or a parameter derived from the at least one measurement, the at least one measurement being made in respect of the connection while operating in one or more of said another mode, said another mode either being: a non-rate-adaptive mode operating in accordance with one of said non-rate-adaptive profiles specifying a fixed bandwidth at which to set up the connection, the fixed bandwidth being at a predetermined rate as specified in the non-rate-adaptive profile whereby if the specified fixed bandwidth cannot be achieved no connection is made.

12. The system according to claim 11 wherein the rate-adaptive mode is a rate-adaptive digital subscriber line mode, and the said another mode is a non-rate-adaptive digital subscriber line mode.

13. The system according to claim 12 wherein the aggregation transceiver device is a Digital Subscriber Line Access Multiplexer comprising a plurality of central transceiver units operating in accordance with a digital subscriber line standard.

14. The system according to claim 11 wherein the another mode is a non-rate adaptive digital subscriber line mode and the initial profile selection is made based on digital subscriber line historic data.

* * * * *